(12) United States Patent
Chen et al.

(10) Patent No.: US 7,373,844 B1
(45) Date of Patent: May 20, 2008

(54) SWITCH FEEL MEASUREMENT APPARATUS

(75) Inventors: Yifan Chen, Ann Arbor, MI (US); Pietro Buttolo, Dearborn Heights, MI (US); Basavaraj Tonshal, Livonia, MI (US); James Rankin, II, Novi, MI (US); Gary Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 11/607,533

(22) Filed: Dec. 1, 2006

(51) Int. Cl.
*G01L 3/14* (2006.01)
(52) U.S. Cl. .................... 73/862.322; 73/862.381; 73/862.541; 324/142
(58) Field of Classification Search .......... 73/862.322, 73/862.381, 862.541; 324/142
See application file for complete search history.

(56) References Cited

U.S. PATENT DOCUMENTS

| 5,117,189 | A | * | 5/1992 | Terminiello et al. | ........ 324/415 |
| 5,388,467 | A | * | 2/1995 | Jereb et al. | ............ 73/862.381 |
| 6,621,275 | B2 | * | 9/2003 | Cotton et al. | ................ 324/537 |
| 6,744,268 | B2 | * | 6/2004 | Hollman | ..................... 324/758 |
| 6,900,641 | B2 | * | 5/2005 | Draggie et al. | ............. 324/418 |
| 7,141,963 | B1 | | 11/2006 | Rankin, II et al. | |

* cited by examiner

*Primary Examiner*—Edward Lefkowitz
*Assistant Examiner*—Freddie Kirkland, III
(74) *Attorney, Agent, or Firm*—David B. Kelley; MacMillan, Sobanski & Todd, LLC

(57) ABSTRACT

A measuring system that relate to the measurement of relatively small one degree of freedom mechanisms, such as pivoting and rotary switches, is disclosed. In particular end effectors and a kit for assembling various end effector assemblies is disclosed, that allow for accurate measurement of torque versus angular displacement curves for various types of pivoting and rotary switches.

20 Claims, 6 Drawing Sheets though the feel of such switches was determined by consensus in panel studies. This conventional approach, however, does not produce a quantitative, objective, verifiable, and repeatable means for completely measuring the feel of a switch.

SWITCH FEEL MEASUREMENT APPARATUS

BACKGROUND OF INVENTION

The present invention relates to measuring human/mechanism interfaces, and more particularly to such measurement systems that relate to the measurement of relatively small one degree of freedom mechanisms, such as switches.

As the market for sales of products becomes more competitive, a manufacturer must distinguish its products from the competition. Thus, a product design may require more than providing the proper function—it may also require providing a certain feel or image for the product. For example, a small mechanism, such as a switch, may need to not only perform its function of adjusting the operation of a product, but also provide a certain feel to the switch operator while being actuated. Such a switch feel may give an impression of quality or distinctiveness to the product, and one may wish to have this particular feel for all of the switches on a given product—that is, a switch feel harmony. Thus, the feel of a switch may be almost as important as the function the switch performs. In order to define and achieve this feel, the human/machine interface for that particular switch must be defined.

In addition, for many manufacturers, the switches are fabricated by multiple suppliers. In order to maintain switch feel harmony, then, one must be able to not only define the switch feel characteristics in a quantitative and objective manner, but also possess an ability to measure the switches produced by the suppliers, in an accurate and reliable way, in order to verify that the switches meet the criteria. Consequently, an accurate and repeatable way to define and measure switches is needed.

Conventionally, measurements for determining characteristics of switches were accomplished by mounting the switches in laboratory type fixtures and connecting them to a switch measurement device. Typically, these measurement devices measured the peak force or torque that was applied during switch actuation and possibly also the range of motion. Mostly, though, the feel of such switches was determined by consensus in panel studies. This conventional approach, however, does not produce a quantitative, objective, verifiable, and repeatable means for completely measuring the feel of a switch.

As a result, some of the more advanced systems employ a laboratory type fixture with a more advanced measurement device that can measure the force applied to the switch as the switch moves through its range of motion. This force/displacement profile (or torque/angular displacement for a rotary switch), then, provides a more complete definition of the switch properties. And, since each fixture is tailored to the particular switch being measured, the accuracy and repeatability can be high. However, having a separate fixture for each particular switch being tested is an expensive and time consuming way to measure switch characteristics. This is particularly true for products such as automotive vehicles, which have many switches of varying types and sizes.

For switches that rotate or pivot in particular, the switch measurement system must be able to properly grip and/or contact the switch while manipulating the switch about its pivot axis. Preferably, this is accomplished for multiple types of rotating and pivoting switches, all while minimizing the time and effort needed to change from measuring one type of rotating or pivoting switch to another. Of course, in providing the flexibility to switch between measurements of different types of switches, the need to maintain the accuracy for all types being measured is desired.

SUMMARY OF INVENTION

According to an embodiment, there is provided an end effector kit for engaging a pivoting or rotary switch for control by a control unit of a switch measuring system having a force/torque sensor aligned with a measurement axis to obtain torque versus angular displacement measurements. The end effector kit may comprise a mounting hub mountable on the force/torque sensor and alignable with the measurement axis, the mounting hub including at least one of a transverse mounting bore oriented normal to the measurement axis and a longitudinal mounting bore oriented coaxially with the measurement axis; a first shaft slidably mountable in one of the transverse mounting bore and the longitudinal mounting bore and securable therein; a rotary arm adapter including a main body having a first bore and a slotted second bore spaced from the first bore, the rotary arm adapter including a first retainer adjacent to the first bore and a second retainer adjacent to the slotted second bore; and a second shaft slidably mountable in one of the first bore and the slotted second bore and securable therein.

According to an embodiment, there is provided an end effector for a switch measuring system having a motor with a measurement axis and a force/torque sensor operatively engaging the motor, aligned with the measurement axis and operable to measure a torque versus angular displacement for a rotating switch. The end effector may comprise a mounting hub, mounted on the force/torque sensor and aligned with the measurement axis, including a longitudinal mounting bore oriented coaxially with the measurement axis; and a stalk rotary adapter including an adapter coupling mounted in the longitudinal bore, a support ring mounted to the adapter coupling and concentric with the measurement axis, and at least three spaced apart centering engagement pins threadably mounted in the support ring and oriented to extend radially outward from the measurement axis.

An end effector for a switch measuring system having a motor with a measurement axis and a force/torque sensor operatively engaging the motor, aligned with the measurement axis and operable to measure a torque versus angular displacement for at least one of a pivoting and rotating switch. The end effector may comprise a rotary arm adapter including a main body having a circular first bore and a slotted second bore spaced from the first bore, a first rod mount mounted adjacent to the second bore, a second rod mount mounted adjacent to the second bore in opposed relation to the first rod mount, and a retainer engaging the first rod mount to the second rod mount and allowing the first and second rod mounts to selectively slide in the second bore; a first shaft slidably mounted in one of the first bore or the second bore and the first and second rod mounts and selectively securable therein; and a second shaft slidably mounted in the other of the first bore or the second bore and the first and second rod mounts and selectively securable therein; one of the first and second shafts operatively engageable with the force/torque sensor.

According to an embodiment, there is provided an end effector of a switch measuring system having a motor with a measurement axis and a force/torque sensor operatively engaging the motor and aligned with the measurement axis. The end effector is operable to measure a torque versus angular displacement for a pivot arm of a multifunction stalk switch and may include a mounting hub mounted on the force/torque sensor and aligned with the measurement axis, the mounting hub including a transverse mounting bore oriented normal to the measurement axis; a transverse shaft slidably mounted in the transverse mounting bore and extending normal to the measurement axis; an extension coupling mounted on the transverse shaft spaced from the mounting hub; a first engagement rod mounted to the extension coupling and extending parallel to the measurement axis; and a second engagement rod mounted to the extension coupling spaced from the first engagement rod and extending parallel to the measurement axis, the first and second engagement rods defining an engagement fork adapted for receiving a free end of the pivot arm of the multifunction stalk switch.

According to an embodiment, there is provided a method for measuring torque versus angular displacement for a thumbwheel switch to be measured by a switch measuring system, the method comprising the steps of: mounting a measurement pin on a thumbwheel portion of the thumbwheel switch approximately normal to the thumbwheel portion and approximately midway between a full extent of rotational travel in both directions for the thumbwheel portion; aligning a measurement axis for a measurement unit of the switch measuring system with a switch axis for the thumbwheel switch; engaging a recess of an engagement fork, drivable by the measurement unit, with the measurement pin; driving the measurement unit to cause the thumbwheel portion to move through at least a portion of the rotational travel; and measuring the torque versus the angular displacement as the thumbwheel portion is moved through at least a portion of the rotational travel.

An advantage of an embodiment of the present invention is that the end effectors for the switch measuring system provide accurate, repeatable and verifiable switch measurement profiles for switches that pivot or rotate, while being easy to reconfigure and re-align when switching between different types of switches.

An advantage of an embodiment is that the different types of pivoting and rotating switches can be measured while using the same control unit, software, motor and sensors, thus minimizing the number of different parts required and minimizing the time needed to change from measuring one type of switch to another.

An advantage of an embodiment is that the different types of end effectors can be provided in a single end effector kit that allows for the maximum number of pivoting and rotary switch types to be measured, while minimizing the effort required by a person wishing to take the switch measurements. Also, a rotary arm adapter—which allows for a significant amount of flexibility in types and sizes of switches to be measured—may be provided in the kit.

DETAILED DESCRIPTION

Figure 1:
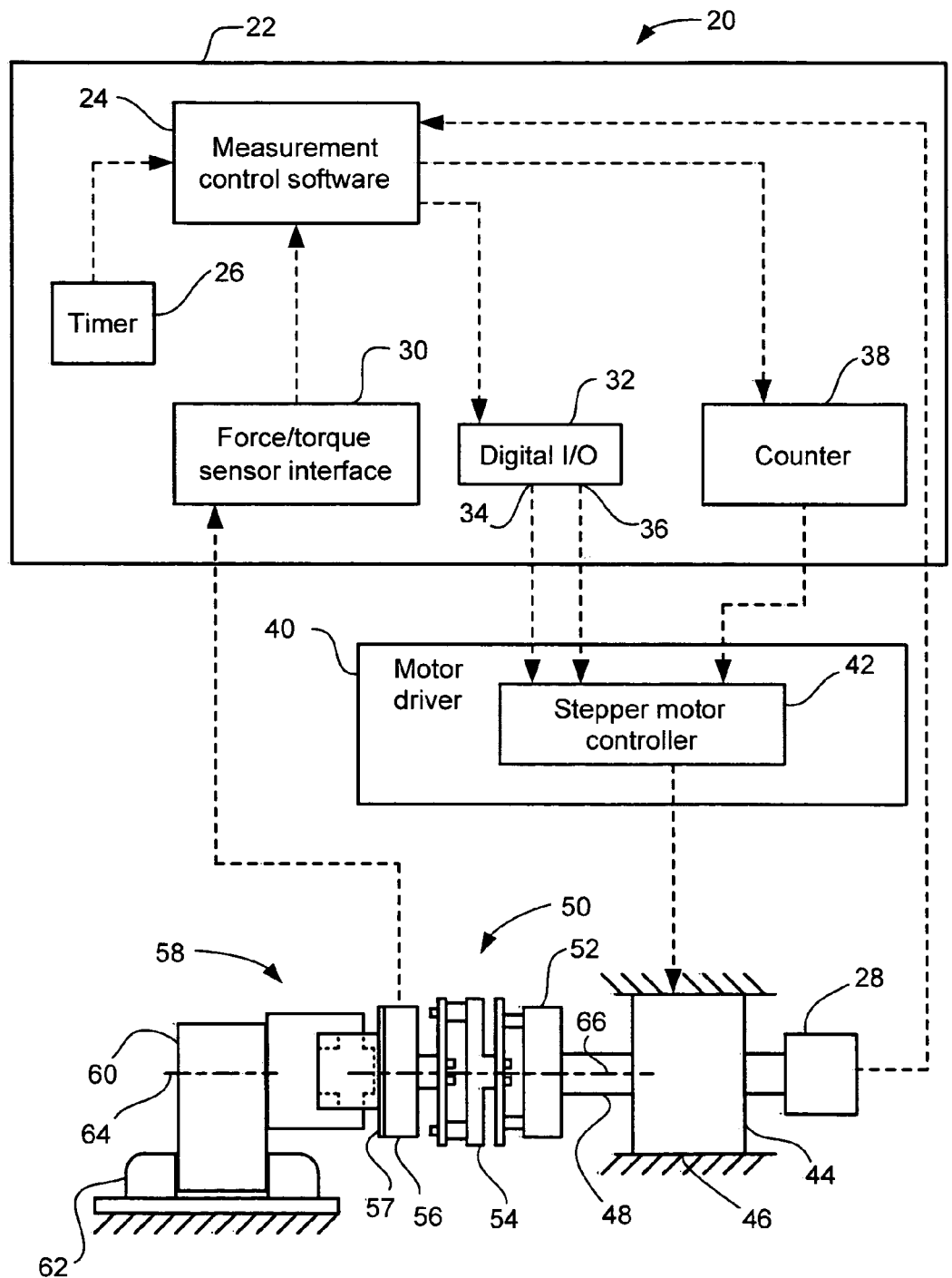
FIG. 1 is a schematic diagram of an overall switch measuring system in accordance with embodiments of the present invention.

FIG. 1 illustrates a portion of a switch measuring system 20, which is optimally employed for accurately measuring a torque/angular displacement profile for small one degree of freedom mechanisms, such as switches. The switch measurement system 20 is, in effect, a type of physical impedance meter. That is, it can measure resistance to the motion of a mechanism as it travels along its predefined path, such as, for example, static friction, dynamic friction, inertia, weight, spring forces, and air pressure. These forces give the mechanism its feel characteristics as a human moves the mechanism along its path.

The switch measuring system 20 includes a control unit 22, such as, for example, a general purpose computer running a general purpose operating system, such as a MICROSOFT WINDOWS operating system, produced by Microsoft Corporation, of Redmond, Wash. The control unit can also be a special purpose computer, if so desired. The control unit 22 includes a graphical user interface to allow a user to see measured torque/angular displacement (or force/displacement) profiles. The dashed lines shown in FIG. 1 represent electrical (or other types of communication/power) connections between various system components.

In particular, the control unit 22 may include measurement control software 24 that receives input from a timer 26. The measurement control software 24 may also interface with an encoder 28, and a force/torque sensor interface 30, (which may be on a separate interface card connected to the control unit 22). The measurement control software also interfaces with a digital input/output (I/O) 32, which may have an enable signal output 34 and a directional signal output 36. A counter algorithm 38 may receive input from the measurement control software 24. The digital I/O 32 and counter 38 may be on separate interface cards connected to the control unit 22, if so desired. The software 24 may include the graphical user interface, as discussed above, a storage routine to record, organize and store torque/angular displacement (or force/displacement) profiles, an editor to edit the motion paths, and an output routine to provide output data that accurately describes the torque/angular displacement profiles of a switch.

Electronically connected to the output from the control unit 22 is a motor driver 40, including a stepper motor controller 42. The stepper motor controller 42 has inputs for receiving output from the counter 38 as well as the enable signal output 34 and direction signal output from the digital I/O 32. The computing system, software and motor controller discussed so far assumes that a rotary stepper motor 44 is employed. If one desires to employ a different type of motor, then the computing system, software and motor controller would, of course, be modified to interface with that type of motor. Although, a stepper motor is generally preferable since it can be easily controlled open loop.

The stepper motor controller 42 electronically interfaces with the motor 44, which is mounted to an adjustable fixture 46. The fixture 46 can adjust to locate and orient the motor as needed for a particular switch being measured, and then be secured in place. A motor shaft 48 extends from the motor 44 and engages a measurement unit, indicated generally at 50.

The measurement unit 50 may include a gear reductor 52, that may be connected to and rotationally driven by the motor shaft 48. A Naugler coupling 54 may connect to and be driven by the gear reductor 52. The Naugler coupling 54 has the ability to couple shafts together while compensating for angular, lateral and axial misalignment, and while providing essentially zero backlash and constant angular velocity between the shafts. Without such a coupling, misalignment of the measurement unit 50 relative to a switch (discussed below) may result in errors in the measured torque. The gear reductor 52 and Naugler coupling 54, though, are optional.

The Naugler coupling 54 may then connect to and drive a force/torque sensor 56 (or the motor shaft 48 may connect to the sensor 56 if the gear reductor 52 and Naugler coupling 54 are not employed). The force/torque sensor 56 is, in turn, connected to a mounting hub 57 of an end effector, indicated generally at 58. The end effector 58 is the part of the measurement unit 50 that engages the particular switch 60 being measured. The switch measuring system 20 may also include a switch mounting support 62 for securing the switch 60 while it is being measured. The measurement unit 50 (including the end effector 58) and switch 60 are only illustrated generally in FIG. 1, in order to show how they can fit into the overall setup; they are shown in greater detail in the embodiments of FIGS. 2-12, as discussed below.

The control unit 22 causes the motor 44 to actuate the switch 60 over its path of travel while recording the torque measurements. The motor 44 causes the switch 60 to move with various velocity profiles over its path, providing a number of torque/angular displacement curves (not shown) that can be used to define the switch 60. The measurement unit 50 is configured for measuring torque/displacement curves for a switch 60 that is a pivoting or rotary switch. The switch 60 has a switch axis 64 about which it pivots or rotates, and the measurement unit 50 has a measurement axis 66. To obtain the most accurate measurements, the switch axis and the measurement axis are preferably parallel.

Figure 2:
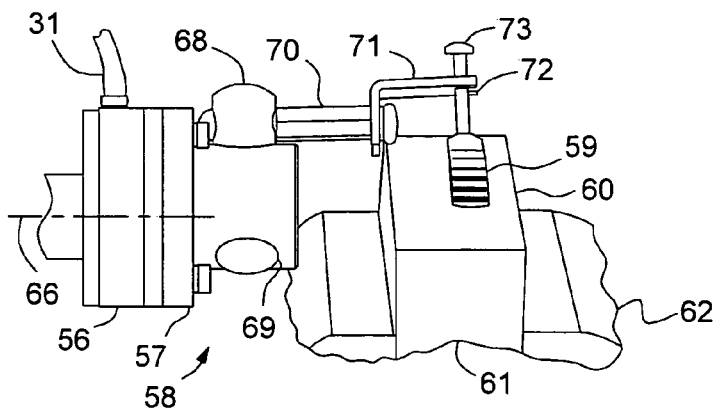
FIG. 2 is a perspective view of a portion of a thumbwheel switch measuring system in accordance with a first embodiment of the present invention.

FIG. 2 illustrates a first embodiment of the end effector 58, driven and controlled by the measurement unit 50 and switch measurement system 20, such as that disclosed in FIG. 1. This particular end effector 58 is employed to measure a thumbwheel 59 of a thumbwheel switch 60, which includes a switch base 61 mounted in the switch mounting support 62. Typically, in the past, thumbwheel switches were not measured because hardware capabilities did not exist for obtaining an accurate measurement.

The mounting hub 57 is mounted to the force/torque sensor 56, which includes an electrical connection 31 to the force/torque sensor interface (shown in FIG. 1). The end effector 58 also includes a short transverse shaft 68, mounted in and extending from a transverse mounting bore 69 in the mounting hub 57. This shaft 68 may be secured by a set screw or other conventional means (not shown). An extension bar 70 mounts to and extends from the short transverse shaft 68 parallel to the measurement axis 66. An engagement fork 71 is mounted to and extends from the extension bar 70. A free end of the engagement fork 71 defines a recess 72.

A measurement pin 73 is rigidly mounted into the thumbwheel 59. The measurement pin 73 is mounted about midway between the full extent of travel in each direction. The engagement fork 71 is aligned such that the recess 72 will engage the measurement pin 73 for movement in both directions.

Figure 3:
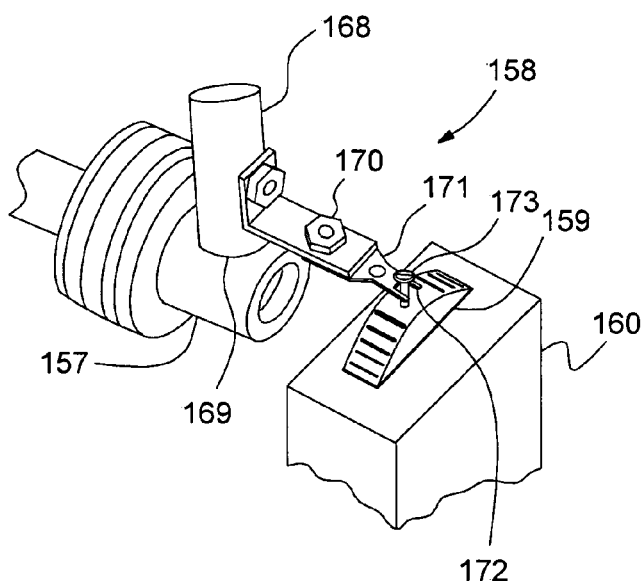
FIG. 3 is a perspective view of a portion of a thumbwheel switch measuring system in accordance with a second embodiment of the present invention.

FIG. 3 is similar to embodiment of FIG. 2, but illustrates a second embodiment of the end effector 158 for measuring a thumbwheel 159 of a thumbwheel switch 160. This embodiment has many elements in common with that of the first embodiment, and to avoid unnecessary repetition of the description, the same reference numerals have been used for similar elements but falling within the 100-series. This embodiment employs a somewhat different assembly forming the end effector 158.

A short transverse shaft 168 still mounts into the transverse mounting bore 169 of the mounting hub 157, but the extension bar is replaced with a small bracket 170 that mounts to the transverse shaft 168. The engagement fork 171 then mounts to this bracket 170. The engagement fork 171 still includes the recess 172 that engages the measurement pin 173, which is mounted in the thumbwheel 159. The end effector 158 of this embodiment may be employed instead of that of the first embodiment when extra clearance or fixture flexibility is not needed.

Figure 4:
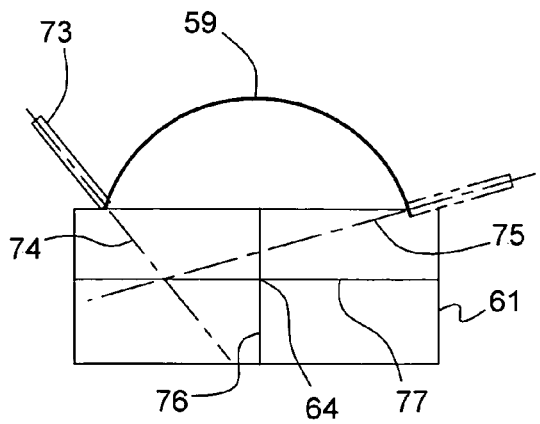
FIG. 4 is a schematic view illustrating a thumbwheel switch alignment procedure applicable to the thumbwheel switch measuring systems of FIGS. 2 and 3.

FIG. 4 (in conjunction with FIGS. 1 and 2) schematically illustrates how the measurement axis 66 of the measurement unit 50 can be accurately aligned with the switch axis 64 of the thumbwheel switch 60. While discussed relative to FIG. 2, this alignment process can be employed with the end effector of FIG. 3 as well.

The first step is to locate generally where the measurement pin 73 should be mounted in the thumbwheel 59. To do this, one rotates the thumbwheel 59 fully to both ends of its travel and inserts the pin 73 approximately midway between the full extent of travel in either direction—generally normal to the surface of the thumbwheel 59 at this location. This assures that the pin 73 will not interfere with the full extent of movement of the thumbwheel 59.

Step two, if a center of rotation (i.e., the switch axis 64) of the thumbwheel 59 is not obvious from the switch base 61, the center of rotation can be estimated, even if the pin 73 is not exactly perpendicular to the surface of the thumbwheel 59 where it is inserted. This second step has several sub-steps. Step 2a, move the pin 73 to a first extreme position in a first direction and draw a first alignment line 74 (shown as a center line) on the switch base 61 representing a longitudinal axis of the pin 73 in that position. Step 2b, move the pin 73 to the opposite extreme position (shown in phantom) and draw a second alignment line 75 (shown as a center line) on the switch base 61 representing a longitudinal axis of the pin 73 in that opposite position. Step 2c, mark a vertical centerline 76 on the switch base 61 midway between first and second ends of the opening in the switch base 61 through which the thumbwheel 59 extends. Step 2d, mark a horizontal line 77 that is perpendicular to the centerline 76 and passes through an intersection of the first and second alignment lines 74, 75 of the pin 73. The intersection of the centerline 76 and the horizontal line 77 is a close approximation of the center of rotation (approximate location of switch axis 64).

Step three, mount the thumbwheel switch base 61 in the switch mounting support 62 securely so that it will not move during switch measurement. Step four, align the measurement axis 66 with the estimated switch axis 64. Step five, mount the end effector 58 with the recess 72 engaging the measurement pin 73. The control unit 22 of the switch measuring system 20 can now be employed to obtain accurate torque versus angular displacement curves for this thumbwheel switch 60.

Figure 5:
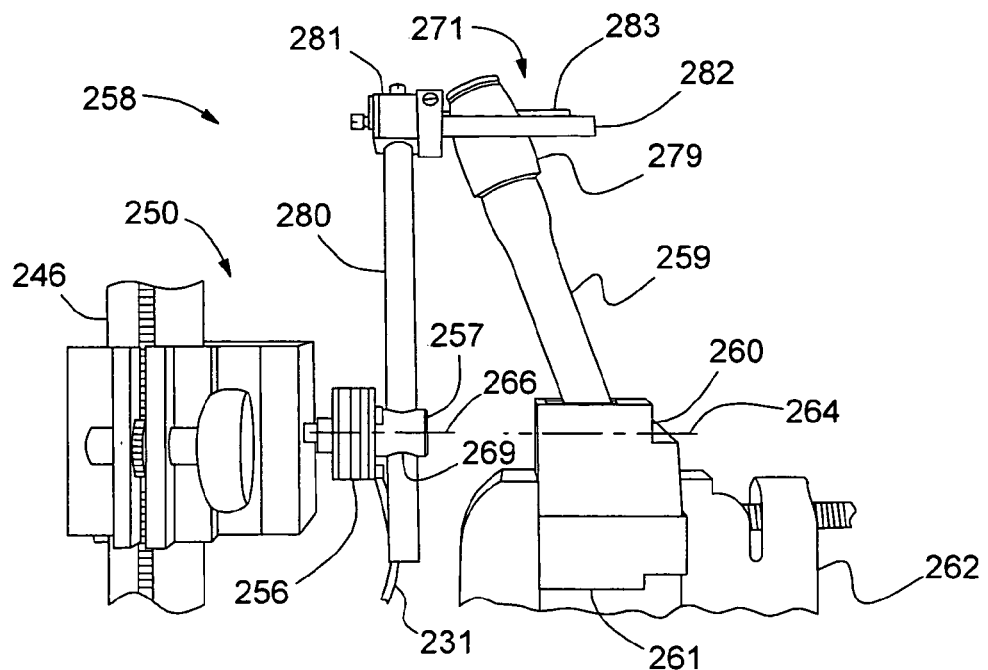
FIG. 5 is an elevation view illustrating a stalk switch measuring system in accordance with a third embodiment of the present invention.
Figure 6:
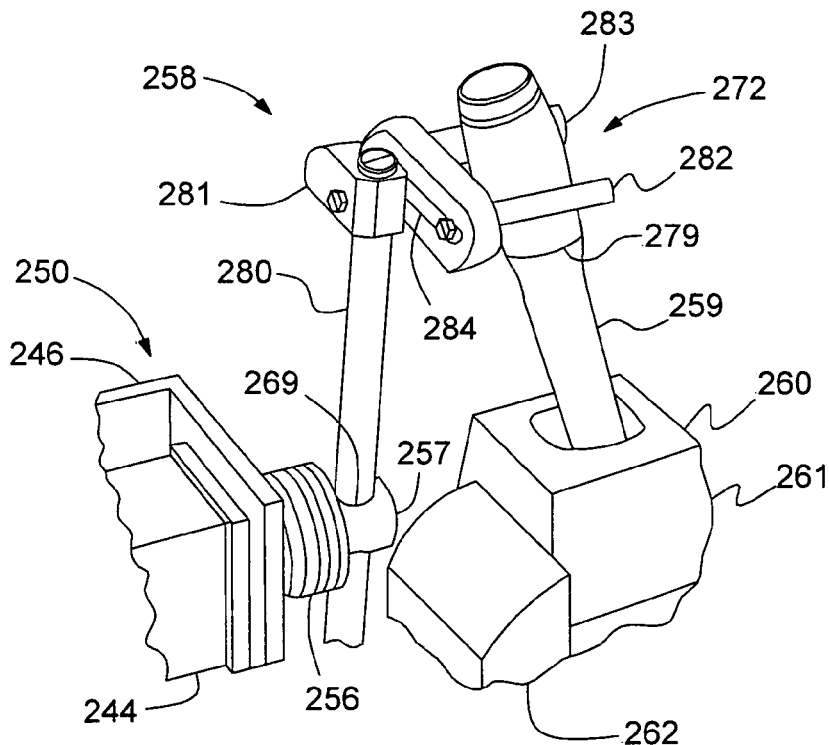
FIG. 6 is a perspective view of the measuring system of FIG. 5.
Figure 7:
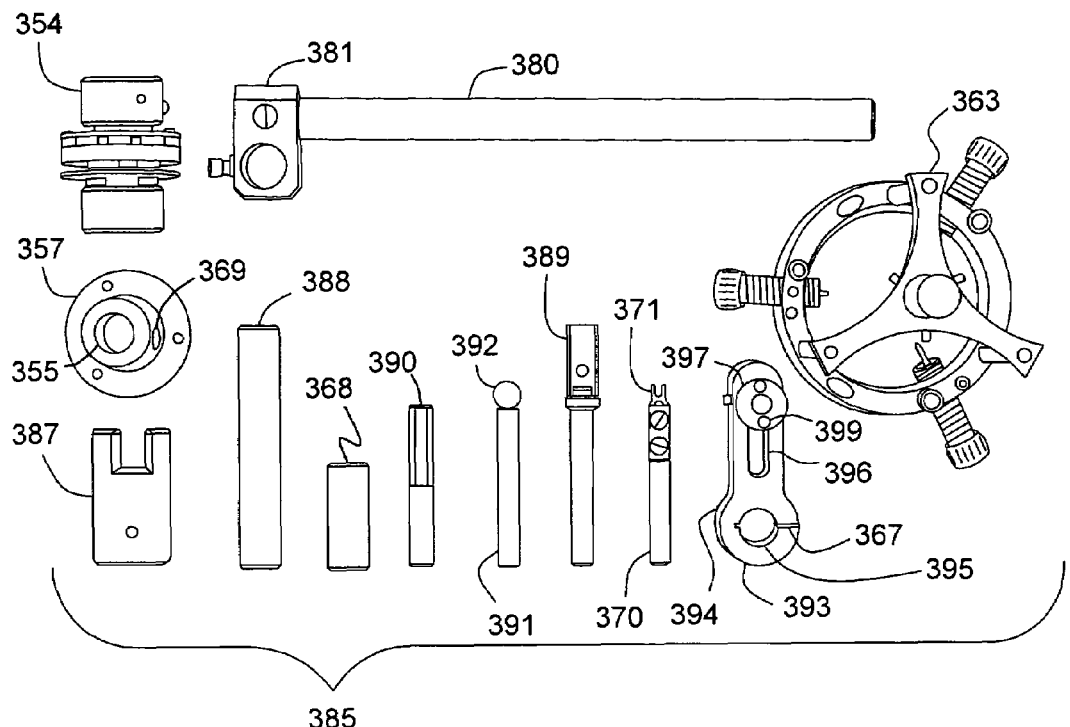
FIG. 7 is a view of individual components of an end effector kit for use with a rotary switch measuring system in accordance with a fourth embodiment of the present invention.

FIGS. 5 and 6 illustrate a third embodiment of the end effector 258 for measuring a pivot arm 259 of a multifunction stalk switch 260. This embodiment has many elements in common with that of the previous embodiments, and to avoid unnecessary repetition of the description, the same reference numerals have been used for similar elements but falling within the 200-series. This embodiment employs a different end effector 258 that is particularly advantageous for measuring torque versus angular displacement for movement of the pivot arm 259 relative to the switch base 261.

A typical multifunctional stalk switch 260 to be measure has two pivoting degrees of freedom (e.g., headlamp flash and turn signal), plus at least one end rotary knob 279 (another degree of freedom) for other controls. In order to obtain meaningful torque versus annular displacement curves, the different degrees of freedom are measured independently. The end effector 258 shown in FIGS. 5 and 6 is for measuring pivoting of the pivot arm 259. The particular one of the two pivoting degrees of freedom to be measured depends upon the orientation of the switch base 261 in the switch mounting support 262 (i.e., rotation of ninety degrees will change the degree of freedom being measured).

The mounting hub 257 is mounted to the force/torque sensor 256, which includes an electrical connection 231 to the force/torque sensor interface (shown in FIG. 1). The end effector 258 also includes a long transverse shaft 280, mounted in and extending from a transverse mounting bore 269 in the mounting hub 257. This shaft 280 may be secured by a set screw or other conventional means (not shown). An extension coupling 281 mounts to the long transverse shaft 280. A pair of engagement rods 282, 283 are mounted to the extension coupling 281 and preferably extend generally parallel to the measurement axis 266. One of the engagement rods 282 mounts in an adjustment slot 284 in the extension coupling 281, allowing it to slide closer to and away from the other rod 283 in order to account for the diameter of the free end of the particular pivot arm 259 being measured. The pair of engagement rods 282, 283, in essence, form an engagement fork 271 defining a recess 272, within which the pivot arm 259 is entrapped.

The process for measuring the pivoting motion of the pivot arm portion 259 of the multi-function stalk switch 260 may include the following. Step one, identify the axis of pivot (i.e., switch axis 264 for the pivot arm 259). Step two, mount the switch base 261 of the multifunction stalk switch 260 securely in the switch mounting support 262—oriented appropriately for the desired one of the two degrees of freedom to be measured. Step three, align the measurement axis 266 with switch axis 264 associated with the pivoting of the pivot arm 259. This alignment may include an adjustable fixture 246 that will precisely raise and lower the motor 244 and force/torque sensor 256 of the measurement unit 250. Step four, mount the end effector 258 on the force/torque sensor 256 and adjust the long transverse shaft 280 and the pair of engagement rods 282, 283, with one each on either side of the pivot arm 259. Step five, manually rotate the end effector 258 to actuate the pivot arm 259 and assure that contact points between the pivot arm 259 and the engagement rods 282, 283 do not change over the range of pivoting. If they do, this may be an indication of misalignment of the measurement axis 266 with the switch axis 264. The switch measuring system can now perform its routine to determine the torque versus angular displacement curves for the pivoting portion of the multi-function stalk switch 260.

FIGS. 7-12 illustrate an end effector kit 385 and some examples of various components of the kit being employed to measure different types of pivoting and rotary switches, according to a fourth embodiment. The end effector kit 385 and its components may be employed with a switch measuring system 20 such as that shown in FIG. 1. This embodiment has many elements in common with that of the previous embodiments, and to avoid unnecessary repetition of the description, the same reference numerals have been used for similar elements but falling within the 300-series. This end effector kit 385 is particularly advantageous for being able to quickly switch between different components of the kit to form various end effector assemblies that are well suited to generate accurate torque versus angular displacement curves for the particular type of switch being measured. Some examples of types of pivoting and rotary switches that may be measured include thumbwheel, push-pull, rocker, rotary knob, stalk pivot, and stalk rotary.

The end effector kit 385 may include a Naugler coupling 354, which may not attach directly to other components in the kit 385, but may be optionally mounted in a measurement unit as shown in FIG. 1. The kit may also include a mounting hub 357 that mounts to the force/torque sensor 356 (shown in FIGS. 9-11). The mounting hub 357 may include a transverse mounting bore 369 and a longitudinal mounting bore 355. A panel rotary adapter 387 may be included in the kit 385, and can be used to engage some types of rotary knobs (not shown) that have an axis of rotation generally normal to the front surface of such switches. The kit may also include shafts of various lengths, such as a long transverse shaft 380, a short transverse shaft 368 and an intermediate length transverse shaft 388. The terms long, short and intermediate length are used merely to refer to the lengths of the shafts relative to one another. An extension adapter 389 may also be included in the kit 385 and can be employed when extra clearance or fixture flexibility is needed. A hexagonally ended engagement rod 390 may also be included in the kit 385, as well as an extension coupling 381, which both add additional flexibility to the kit 385.

The end effector kit 385 also includes some other end effector components that are specifically shaped for providing the desired contact with a particular type of switch. A ball engagement rod 391 includes a spherical end 392 and may be particularly effective when used to contact a push/pull rocker switch, discussed below relative to FIG. 9. An engagement fork 371 mounted on an extension bar 370 may be particularly effective when used to measure a thumbwheel switch, discussed below relative to FIG. 10. And, a stalk rotary adapter 363 may be particularly effective when used to engage an end rotary knob on a multifunction stalk switch, discussed below relative to FIG. 12.

One component of the kit 385 that is particularly useful in adapting end effector assemblies to account for various sizes and types of pivoting and rotary switches is a rotary arm adapter 393. The rotary arm adapter 393 allows one to quickly adapt to different switch measurement requirements based on a generic, three-part assembly, without a lengthy dismantling and reconfiguration process. The rotary arm adapter 393 includes a main body 394 having a circular mounting bore 395 spaced from a mounting slot 396. A first rod mount 397 mounts over the mounting slot 396 opposite a second rod mount 398 (shown in FIG. 8). The first rod mount 397 includes a pair of retention screws 399 that extend through the mounting slot 396 and engage the second rod mount 398. The second rod mount 398 includes a set screw 386 (shown in FIG. 8) mounted therein. Also, a retention fastener 365 (shown in FIG. 8) extends across a securement slot 367 that intersects the mounting bore 395.

Figure 8:
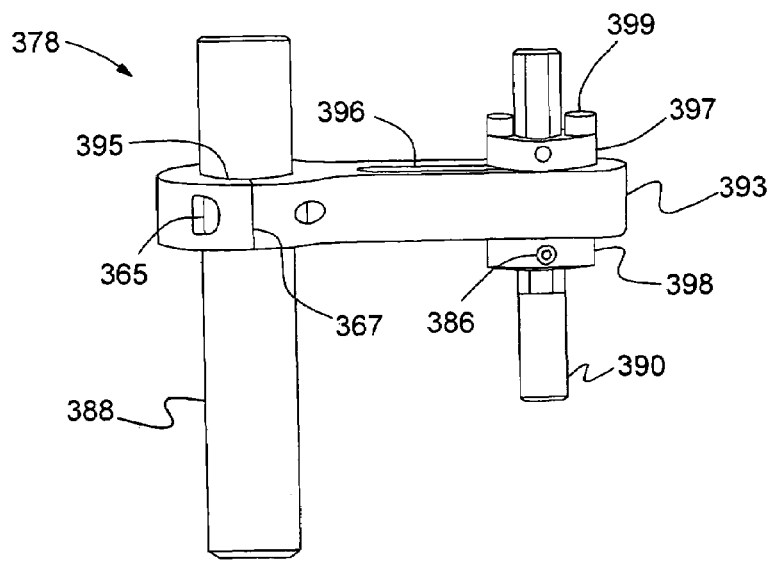
FIG. 8 is a plan view, on an enlarged scale, of some of the components of the kit of FIG. 7 assembled for use in an end effector of the rotary switch measuring system.

FIG. 8 Illustrates an example of a sub-assembly 378 derived from components of the end effector kit 385 that employs the rotary arm adapter 393. This sub-assembly 378 highlights the significant amount of flexibility provided by the rotary arm adapter 393 for adapting the particular end effector to properly engage the switch to be measured. This sub-assembly 378 includes the intermediate length shaft 388 mounted in the mounting bore 395, and the hex engagement rod 390 mounted in the rod mounts 397, 398. The various adjustments available include sliding the intermediate length shaft 388 through the mounting bore 395 to the desired location before squeezing the securement slot 367 closed with the retention fastener 365. Another adjustment available is to slide the hex engagement rod 390 to its desired location before tightening the set screw 386 in the second rod mount 398. In addition, the first and second rod mounts 397, 398, along with the hex rod 398, can be slid along the mounting slot 396 to space the hex rod 398 a desired distance from the intermediate length shaft 388 before tightening the retention screws 399. Of course, the intermediate length shaft 388 and hex rod 390 can be replaced with other rods and shafts from the kit 385, depending upon the particular switch application; and either one of the mounting bore 395 and the mounting slot 396 can be the opening that holds a component meant to engage with the mounting hub 357 (not shown in FIG. 8).

Figure 9:
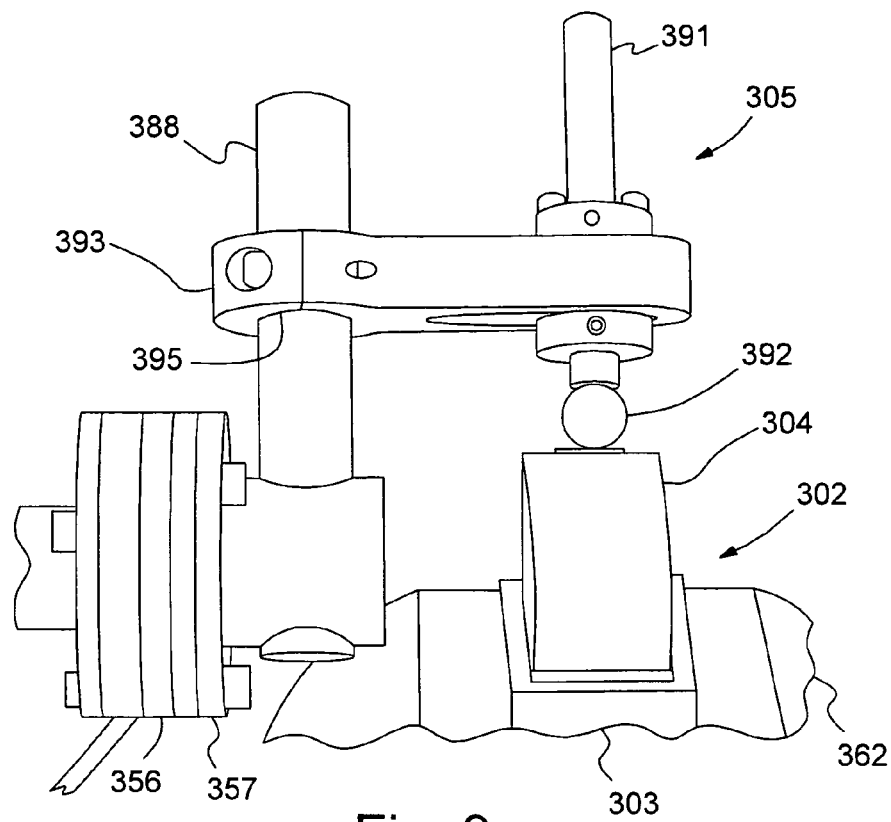
FIG. 9 is a perspective view of a portion of the rotary switch measuring system and kit of FIG. 7, configured to measure a push/pull rocker switch.

FIGS. 9-12 illustrate examples of switches that can be measured using the end effector kit 385. FIG. 9 illustrates components of the kit 385 (of FIG. 7) being applied to measure a push/pull rocker type switch 302, which has a switch base 303 securely mounted in the switch mounting support 362 and a push/pull rocker 304 being acted upon by an end effector assembly 305. The end effector assembly 305 is derived from components of the kit illustrated in FIG. 7. The end effector assembly 305 includes the mounting hub 357, mounted to the force/torque sensor 356, with the intermediate length shaft 388 mounted in the hub 357. The rotary arm adapter 393, of the end effector assembly 305, is positioned so that its mounting bore 395 is secured around the intermediate length shaft 388. Also, this end effector assembly 305 includes the ball engagement rod 391 mounted to the rotary arm adapter 393, with the spherical end 392 engaging the push/pull rocker 304. As one can see, this end effector assembly 305 allows for a significant amount of adjustment in multiple directions, including those discussed relative to the rotary arm adapter 393 shown in FIG. 8. These adjustments assure that the desired orientation and alignment can be achieved to obtain accurate push/pull rocker switch measurements.

Figure 10:
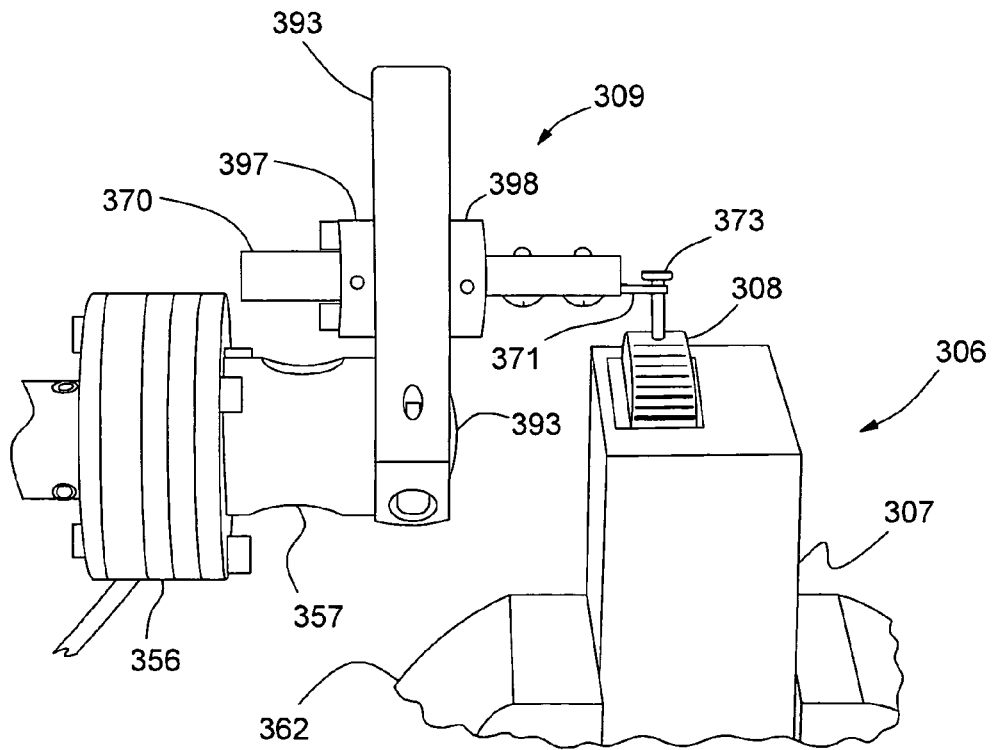
FIG. 10 is a perspective view of a portion of the rotary switch measuring system and kit of FIG. 7, configured to measure a thumbwheel switch.

FIG. 10 illustrates components of the kit 385 (of FIG. 7) being applied to measure a thumbwheel type switch 306, which has a switch base 307 securely mounted in the switch mounting support 362 and a thumbwheel 308 being acted upon by an end effector assembly 309. The end effector assembly 309 is again derived from components of the kit illustrated in FIG. 7. This assembly 309 includes the mounting hub 357, short transverse shaft 368, rotary arm adapter 393, extension bar 370 and engagement fork 371. In addition, a measurement pin 373 is employed, essentially in the same way as shown and described in FIGS. 2 and 4 above. The mounting hub 357 is mounted to the force/torque sensor 356, with the rotary arm adapter 393 mounted to the hub 357 via the short transverse shaft 368. The extension bar 370 is also mounted to the adapter 393, via the first and second rod mounts 397, 398. A number of adjustments can be made to this end effector assembly 309 to assure that the desired orientation and alignment can be achieved to obtain accurate thumbwheel switch measurements.

Figure 11:
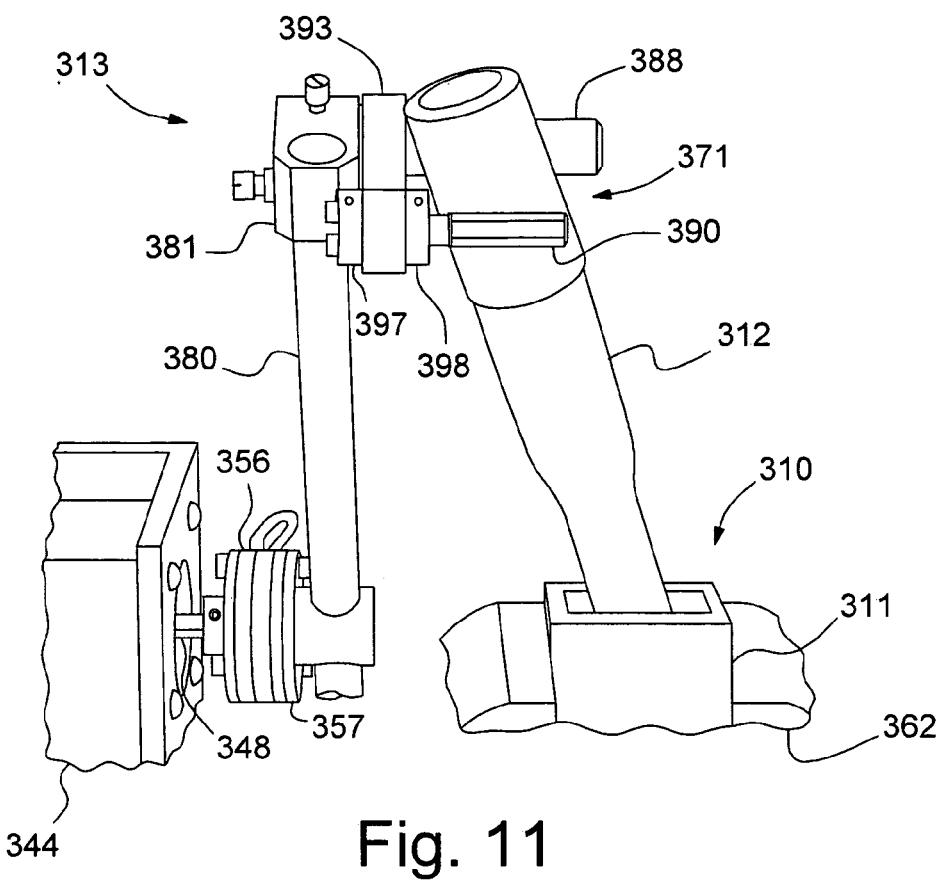
FIG. 11 is a perspective view of a portion of the rotary switch measuring system and kit of FIG. 7, configured to measure a pivot arm of a multifunction stalk switch.

FIG. 11 illustrates components of the kit 385 (of FIG. 7) being applied to measure a pivoting motion of a multifunction stalk switch 310, which has a switch base 311 securely mounted in the switch mounting support 362 and a pivot arm 312 being acted upon by an end effector assembly 313. The end effector assembly 313 is derived from components of the kit illustrated in FIG. 7. This assembly 313 includes the mounting hub 357, long transverse shaft 380, extension coupling 381, rotary arm adapter 393, intermediate length transverse shaft 388, and hex engagement rod 390. The mounting hub 357 is again mounted to the force/torque sensor 356, aligned coaxially with the motor shaft 348 of the motor 344. The long transverse shaft 380 is mounted to the mounting hub 357 near one end and supports the extension coupling 381 at its other end. The intermediate length transverse shaft 388 not only mounts to both the extension coupling 381 and the rotary arm adapter 393, but it also engages one side of the pivot arm 312. The hex engagement rod 390 mounts to the first and second rod mounts 397, 398 and engages an opposed side of the pivot arm 312 to define an engagement fork 371. Again, a significant amount of adjustability is provided by the end effector assembly 313 to assure that proper orientation and alignment can be achieved to obtain accurate pivot arm measurements for the multifunction stalk switch 310.

Figure 12:
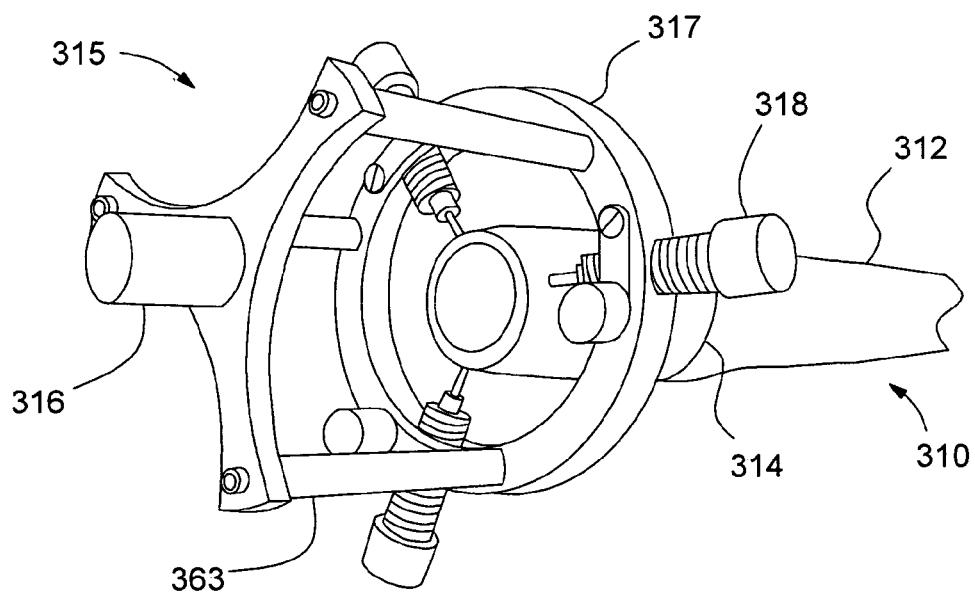
FIG. 12 is a perspective view of a portion of the kit of FIG. 7, configured to measure an end rotary knob of the multifunction stalk switch of FIG. 11.

FIG. 12 illustrates components of the kit 385 (of FIG. 7) being applied to measure a rotary motion of an end rotary knob 314 of the multifunction stalk switch 310. The end rotary knob 314 is located on the end of the pivot arm 312 and has a different type of motion, so a different end effector assembly 315 is needed from that used to measure the pivoting motion of the pivot arm 312 (shown in FIG. 11). However, this end effector assembly 315 is also derived from components of the kit illustrated in FIG. 7. The stalk rotary adapter 363 is used and includes an adapter coupling 316 that mounts in the mounting hub 357 (shown in FIG. 11) coaxial with the motor shaft 348 (shown in FIG. 11). The stalk rotary adapter 363 also includes a support ring 317 from which three threaded contact/centering engagement pins 318 extend. The engagement pins 318 can be adjusted by screwing them in and out on the support ring 317 so that they contact the end rotary knob 314 and hold it coaxial with the motor shaft 348. The large diameter of the support ring 317, adjustability of the pins 318, and spacing of the support ring 317 from the mounting hub 357 provide for a significant amount of adjustment, which allows for various sizes and shapes of end rotary knobs 314 (or other similar types of rotary knobs) to be measured accurately.

One will note from reviewing the above noted embodiments that, while the architecture for the switch measurement devices and the fixturing setup used to quickly and accurately mount and align the measurement units is essentially the same for different types of pivoting and rotating switches, the different types of motion require modified end effectors to compensate for the different switch motion. Consequently, relatively quick and easy modifications to the measurement unit will allow one to switch from measuring one type of pivoting or rotating switch to another while still assuring accurate and repeatable switch measurement results.

The specific examples of a one rotational degree of freedom measuring system discussed herein have been directed to switches, but this system is, of course, applicable to measuring and creating torque versus angular displacement profiles for other types of small, one rotational degree of freedom mechanisms.

While certain embodiments of the present invention have been described in detail, those familiar with the art to which this invention relates will recognize various alternative designs and embodiments for practicing the invention as defined by the following claims.

What is claimed is:

1. An end effector kit for engaging a pivoting or rotary switch for control by a control unit of a switch measuring system having a force/torque sensor aligned with a measurement axis to obtain torque versus angular displacement measurements, the end effector kit comprising:
    a mounting hub mountable on the force/torque sensor and alignable with the measurement axis, the mounting hub including at least one of a transverse mounting bore oriented normal to the measurement axis and a longitudinal mounting bore oriented coaxially with the measurement axis;
    a first shaft slidably mountable in one of the transverse mounting bore and the longitudinal mounting bore and securable therein;
    a rotary arm adapter including a main body having a first bore and a slotted second bore spaced from the first bore, the rotary arm adapter including a first retainer adjacent to the first bore and a second retainer adjacent to the slotted second bore; and
    a second shaft slidably mountable in one of the first bore and the slotted second bore and securable therein.

2. The end effector kit of claim 1 wherein the second shaft includes an end defining an engagement fork.

3. The end effector kit of claim 1 wherein the second shaft includes an end defining a spherical shaped ball engagement portion.

4. The end effector kit of claim 1 including a third shaft mountable in the other of the first bore and the slotted second bore and securable therein.

5. The end effector kit of claim 1 wherein the second shaft includes an end defining a hexagonal shaped cross section.

6. The end effector kit of claim 1 including a panel rotary adapter mountable on the mounting hub extending parallel to the measurement axis and including a pair of engagement flanges that extend parallel to the measurement axis.

7. The end effector kit of claim 1 including a Naugler coupling mountable between a motor shaft and the force/torque sensor.

8. An end effector for a switch measuring system having a motor with a measurement axis and a force/torque sensor operatively engaging the motor, aligned with the measurement axis and operable to measure a torque versus angular displacement for a rotating switch, the end effector comprising:
    a mounting hub, mounted on the force/torque sensor and aligned with the measurement axis, including a longitudinal mounting bore oriented coaxially with the measurement axis; and
    a stalk rotary adapter including an adapter coupling mounted in the longitudinal bore, a support ring mounted to the adapter coupling and concentric with the measurement axis, and at least three spaced apart centering engagement pins threadably mounted in the support ring and oriented to extend radially outward from the measurement axis.

9. An end effector for a switch measuring system having a motor with a measurement axis and a force/torque sensor operatively engaging the motor, aligned with the measurement axis and operable to measure a torque versus angular displacement for at least one of a pivoting and rotating switch, the end effector comprising:
    a rotary arm adapter including a main body having a circular first bore and a slotted second bore spaced from the first bore, a first rod mount mounted adjacent to the second bore, a second rod mount mounted adjacent to the second bore in opposed relation to the first rod mount, and a retainer engaging the first rod mount to the second rod mount and allowing the first and second rod mounts to selectively slide in the second bore;
    a first shaft slidably mounted in one of the first bore or the second bore and the first and second rod mounts and selectively securable therein; and
    a second shaft slidably mounted in the other of the first bore or the second bore and the first and second rod mounts and selectively securable therein; one of the first and second shafts operatively engageable with the force/torque sensor.

10. The end effector of claim 9 wherein the retainer comprises at least one retention screw extending through the first rod mount and being threadably received by the second rod mount, and the second rod mount includes a set screw for selectively securing one of the first shaft and the second shaft in the second bore and the first and second rod mounts.

11. The end effector of claim 9 wherein the main body includes a securement slot extending from the first bore, and the rotary arm adapter includes a fastener extending across the slot in the main body such that the slot may be pulled closed by the fastener for selectively securing one of the first shaft and the second shaft in the first bore.

12. The end effector of claim 11 wherein the retainer comprises at least one retention screw extending through the first rod mount and being threadably received by the second rod mount, and the second rod mount includes a set screw for selectively securing the other of the first shaft and the second shaft in the second bore and the first and second rod mounts.

13. The end effector of claim 9 including a mounting hub mounted on the force/torque sensor and aligned with the measurement axis, the mounting hub including at least one of a transverse mounting bore oriented normal to the measurement axis and a longitudinal mounting bore oriented coaxially with the measurement axis.

14. The end effector of claim 13 wherein the first shaft is mounted in the longitudinal mounting bore, and the second shaft includes an engagement fork extending from an end.

15. The end effector of claim 13 wherein the first shaft is mounted in the transverse mounting bore, and the second shaft includes an end defining a spherical shaped ball engagement portion.

16. An end effector of a switch measuring system having a motor with a measurement axis and a force/torque sensor operatively engaging the motor and aligned with the measurement axis, the end effector operable to measure a torque versus angular displacement for a pivot arm of a multifunction stalk switch comprising:

a mounting hub mounted on the force/torque sensor and aligned with the measurement axis, the mounting hub including a transverse mounting bore oriented normal to the measurement axis;

a transverse shaft slidably mounted in the transverse mounting bore and extending normal to the measurement axis;

an extension coupling mounted on the transverse shaft spaced from the mounting hub;

a first engagement rod mounted to the extension coupling and extending parallel to the measurement axis; and a second engagement rod mounted to the extension coupling spaced from the first engagement rod and extending parallel to the measurement axis, the first and second engagement rods defining an engagement fork adapted for receiving a free end of the pivot arm of the multifunction stalk switch.

17. The end effector of claim 16 wherein the extension coupling includes an adjustment slot and the second engagement rod is mounted in the adjustment slot and slidable therein to vary a distance between the first and second engagement rods.

18. A method for measuring torque versus angular displacement for a thumbwheel switch to be measured by a switch measuring system, the method comprising the steps of:
  (a) mounting a measurement pin on a thumbwheel portion of the thumbwheel switch approximately normal to the thumbwheel portion and approximately midway between a full extent of rotational travel in both directions for the thumbwheel portion;
  (b) aligning a measurement axis for a measurement unit of the switch measuring system with a switch axis for the thumbwheel switch;
  (c) engaging a recess of an engagement fork, drivable by the measurement unit, with the measurement pin;
  (d) driving the measurement unit to cause the thumbwheel portion to move through at least a portion of the rotational travel; and
  (e) measuring the torque versus the angular displacement as step (d) is performed.

19. The method of claim 18 wherein step (b) is further defined by determining the switch axis by: moving the measurement pin to a first end of an opening for the thumbwheel portion, and marking a first alignment line that extends along a longitudinal axis of the measurement pin on a switch base; moving the measurement pin to a second end of the opening for the thumbwheel portion, and marking a second alignment line that extends along the longitudinal axis of the measurement pin on the switch base; marking a centerline on the switch base midway between the first end and the second end of the opening that is normal to a contact surface of the thumbwheel portion; marking an intersection line on the switch base that is normal to the centerline and intersects an intersection of the first alignment line and the second alignment line; and determining that an intersection of the centerline and the intersection line is the switch axis for the thumbwheel switch.

20. The method of claim 18 wherein step (c) is further defined by: aligning the recess of the engagement fork with the measurement pin by mounting a mounting hub on a force/torque sensor aligned with the measurement axis, adjustably mounting a transverse shaft to the mounting hub extending normal to the measurement axis, and operatively engaging the engagement fork to the transverse shaft.

* * * * *